US008805770B2

United States Patent
Narain et al.

(10) Patent No.: US 8,805,770 B2
(45) Date of Patent: Aug. 12, 2014

(54) ROUTER ROUTE RECONFIGURATION PLANNING

(75) Inventors: Sanjai Narain, Madison, NJ (US); Gary Levin, Bedminister, NJ (US)

(73) Assignee: TT Government Solutions, Inc., Basking Ridge, NJ (US)

(*) Notice: Subject to any disclaimer, the term of this patent is extended or adjusted under 35 U.S.C. 154(b) by 317 days.

(21) Appl. No.: 13/112,462

(22) Filed: May 20, 2011

(65) Prior Publication Data

US 2012/0130939 A1 May 24, 2012

Related U.S. Application Data

(60) Provisional application No. 61/346,532, filed on May 20, 2010.

(51) Int. Cl.
*G06F 17/11* (2006.01)
*G06Q 10/04* (2012.01)
*G06Q 10/06* (2012.01)
*H04L 12/24* (2006.01)

(52) U.S. Cl.
CPC ............ *G06Q 10/04* (2013.01); *G06Q 10/0631* (2013.01); *G06F 17/11* (2013.01); *H04L 41/50* (2013.01); *H04L 41/14* (2013.01); *H04L 41/145* (2013.01)
USPC ............... 706/57; 706/19; 709/221; 709/226; 709/239; 709/242

(58) Field of Classification Search
USPC ......................................................... 706/57
See application file for complete search history.

*Primary Examiner* — Jeffrey A Gaffin
*Assistant Examiner* — Nathan Brown, Jr.
(74) *Attorney, Agent, or Firm* — Heslin Rothenberg Farley & Mesiti P.C.

(57) ABSTRACT

A method for solving the reconfiguration planning problem transforms the requirement that an invariant is always preserved into a constraint on the times at which the configuration parameters change. The method then solves this constraint to obtain the required reconfiguration plan. When this constraint is strengthened with a synthesis constraint, it is ensured that any final configuration that is computed is also reachable. An extension of the method allows parameters to take on multiple intermediate values.

3 Claims, 6 Drawing Sheets

ROUTER ROUTE RECONFIGURATION PLANNING

CROSS-REFERENCE TO RELATED APPLICATIONS

This application claims the benefit of U.S. Provisional Application No. 61/346,532, filed on May 20, 2010 which is incorporated by reference herein in its entirety.

GOVERNMENT LICENSE RIGHTS

This invention is based upon work supported in part by United States Air Force Research Laboratory under contract FA9750-07-C-0030. The U.S. Government has certain rights in the invention.

FIELD OF THE INVENTION

The present invention relates generally to reconfiguration planning and specifically to a method for solving the reconfiguration planning problem of computing the order in which the configuration parameters should be changed so that a given invariant is never falsified during transition.

BACKGROUND OF THE INVENTION

Systems such as the Telcordia Technologies, Inc. ConfigAssure system described in Sanjai Narain, Vikram Kaul, Gary Levin, Sharad Malik. *Declarative Infrastructure Configuration Synthesis and Debugging. Journal of Network Systems and Management, Special Issue on Security Configuration*, eds. Ehab Al-Shaer, Charles Kalmanek, Felix Wu. Springer Verlag, 2008, which is incorporated herein by reference, have been developed to solve fundamental configuration problems, namely, specification, synthesis, diagnosis and repair. However, even if the final configuration is known, in general, all configuration parameters cannot be concurrently changed to their new values. The reconfiguration planning problem is computing the order in which these parameters should be changed so that a given invariant is never falsified during the transition. Compounding the hardness of this problem is the fact that no reconfiguration plan may exist for a given final configuration. Furthermore, sometimes parameters need to assume intermediate values, not just initial and final values, before a plan can be constructed.

In artificial intelligence (AI) research, a distinction has traditionally been made between planning, in which choices must be made about which actions to take, and scheduling, in which the set of actions to be performed is predetermined, but their sequence must be calculated. Most realistic problems, however, involve both planning and scheduling, so the two fields often overlap considerably.

Classical planning problems define an initial state, a goal, and a set of actions that may be performed. These actions specify a set of preconditions that must be true before the action may take place, and a set of effects that will be true after the action is completed. A solution to the problem is a sequence of actions to be performed such that the preconditions of each action are met and the effects of the final action make the goal true.

Because the number of possible sequences of actions in a planning problem becomes large very quickly, efficient techniques for solving planning problems have been the focus of much of the work in this area. The most obvious strategy is forward state space search (FSS), in which the planning algorithm begins with the initial state of the problem and picks an action whose preconditions are satisfied as the first action in the solution sequence. This process continues until the goal state is reached. Since the number of possible actions at any state is large, however, the sheer size of the state space often overwhelms the FSS technique unless domain-specific heuristics can be used to guide the search. Most classical planning work has employed goal-directed search, in which the planner works backwards from the goal state. Starting from the goal, an action is chosen that can accomplish the goal, and its preconditions are added to the new state as subgoals, which must in turn be accomplished by other actions. This process continues until the set of subgoals is a subset of the initial state. While goal-directed search can avoid the huge search space required in the forward search case, the space is still large enough that goal-directed planners can solve very few practical problems. More recent work in classical planning has focused on an algorithm named Graphplan Graphplan is a kind of reachability analysis that allows for a drastic reduction in the size of the search space. Starting from the initial state, Graphplan determines, using the actions provided, which conditions are possible (or reachable) after the first state, the second, and so on. This analysis allows the algorithm to determine the minimum size of a correct plan before actually computing it, and has been shown to significantly outperform other techniques.

Planning as satisfiability is a technique that converts a planning problem to a Boolean satisfiability (SAT) problem; the recent success of SAT solvers has allowed this strategy to approach the performance of Graphplan. Beginning with a very short planning length, the encoded SAT problem is solved; if it is unsatisfiable, the length is increased until it becomes satisfiable, at which time the propositional assignment can be translated to a plan.

Traditional scheduling problems are considered to be a special case of the planning problem in which the set of actions is predetermined, and in which it remains only to schedule these actions. In practice, scheduling problems overlap considerably with other areas of planning. Many scheduling problems, for example, involve the allocation of resources; choices about when and how to allocate these resources must be made by the scheduler. A more reasonable distinction between scheduling and planning, then, is that scheduling problems involve a small set of choices over a long and possibly complex schedule, while planning problems involve a possibly huge set of choices many of which may interact in complex ways—over a much shorter amount of time. Scheduling problems generally focus on ordering, while planning problems focus on choices.

AI research in scheduling tends towards solutions to the general scheduling problem, in contrast to operations research, which develops specialized techniques for specific classes of scheduling problems (e.g. flow-shop, job-shop, and sports scheduling).

The most common approach to solving the general scheduling problem is to represent it as a constraint satisfaction problem. Two main possibilities for this encoding have been explored: the assignment of a start time to each task, and the ordering of tasks without regard to concrete times. If the first option is taken, constraints representing the restrictions on resources and ordering become constraints on start times; in the case of the second option, they become constraints on the relative orderings of two actions. The latter approach is most commonly used in recent work, as it reduces the search space considerably.

Scheduling as satisfiability, like planning as satisfiability, has recently become a very efficient one for solving scheduling problems. While the limitations of boolean satisfiability make it difficult to represent arithmetic relations and functions, the speed of modern SAT solvers makes the translation to Boolean formulas an attractive option.

A simple, non-SAT-based reconfiguration planning algorithm was also developed and explored. It uses Prolog to set up the generation of all permutations of configuration variables. The set up is such that if the invariant is falsified by an initial segment of a permutation, then no permutation of the remaining segment is generated. The algorithm efficiently solved some problems of significantly larger size than did the SAT-based algorithm.

However, the performance of the Prolog-based algorithm is critically dependent on the order in which configuration variables are declared as Prolog facts. It is non-trivial for the specification writer to find an efficient ordering. The algorithm also does not address the problem of finding a final configuration for which a reconfiguration plan exists, neither does it allow configuration variables to take on intermediate values.

The algorithm is defined in just 12 lines of formatted Prolog code. The first rule below states that if the list of configuration variables is empty, then the current plan O is the final plan O. The second rule states that if the list T is non-empty, then non-deterministically remove a variable X from it to produce Tp, and check whether the invariant is true for X appended to the front of the current plan O. If so, then compute the plan for Tp with [X|O] as the current plan.

```
plan([ ], O, O).
plan(T, O, Op) :-
    rem(X, T, Tp),
    invariant([X|O]),
    plan(Tp, [X|O], Op).
```

The next two rules remove an element x from the second argument and compute the remainder in the third argument.

```
rem(X, [X|R], R).
rem(X, [A|R], [A|Rp]) :- rem(X, R, Rp).
```

The next two rules compute the value Y of a configuration variable x after a sequence of variables changes O. The first states that if x is a member of O, then Y is its final value. The second states that if not, then, Y is simply the initial value of X. It is assumed that initial and final values are defined by means of Prolog facts each of the form

```
initial_and_final_value(_, _, _).
val(O, X, Y) :-
    member(X, O), !,
    initial_and_final_value(X, _, Y).
val(_, X, Y) :-
    initial_and_final_value(X, Y, _).
```

For the route and tunnel set up example below, definitions of invariant and initial_and_final_value are as follows:

```
invariant(L):-or(not(val(L, route, 1)), val(L, tunnel, 1)).
initial_and_final_value(route, 0, 1).
initial_and_final_value(tunnel, 0, 1).
```

Now, the Prolog query plan ([ ], [tunnel, route], L) returns L=[route, tunnel] where variables are to be changed in reverse order.

SUMMARY OF THE INVENTION

The prior ConfigAssure system was developed to solve fundamental configuration problems, namely, specification, synthesis, diagnosis and repair. However, even if the final configuration is known, in general, all configuration parameters cannot be concurrently changed to their new values. The reconfiguration planning problem is computing the order in which these parameters should be changed so that a given invariant is never falsified during the transition. Compounding the hardness of this problem is the fact that no reconfiguration plan may exist for a given final configuration. Furthermore, sometimes parameters need to assume intermediate values, not just initial and final, before a plan can be constructed.

The present invention is inspired by the planning as satisfiability technique. However, the invention does not contain explicit pre and post conditions or frame axioms and when no intermediate actions are needed, all actions to be performed are fixed. These facts allow the invention to keep the transformation of the invariant extremely simple. In relation to scheduling techniques, the invention's invariants are much more general than the action ordering constraints these techniques allow.

The present invention is a method for solving the reconfiguration planning problem. The method transforms the requirement that an invariant is always preserved into a constraint on the times at which the configuration parameters change. The method then solves this constraint to obtain the required reconfiguration plan. When this constraint is strengthened with a synthesis constraint, it is ensured that any final configuration that is computed is also reachable. An extension of the method allows parameters to take on multiple intermediate values.

The method is illustrated in the context of realistic scenarios from virtual private-networking where invariants are preservation of connectivity, security and performance.

In the following description the invention will be described with several scenarios: setting up security and routing so that unencrypted data never leaves a router; decommissioning a router and deploying a new one without disrupting connectivity; migrating from static routing to routing over a VPN without disrupting connectivity; a combination of the previous two scenarios; and finally increasing MTUs (Maximum Transmission Unit) while minimizing packet loss.

The inventive method is an algorithm to compute reconfiguration plans. It also allows configuration parameters to take on intermediate values.

The invention can be used to compute a final configuration for which a reconfiguration plan exists.

The present invention will be more clearly understood when the following description is read in conjunction with the accompanying drawings.

DETAILED DESCRIPTION

A problem of reconfiguration planning is safely transitioning a system from its initial configuration to its final one. In general, all configuration variables cannot be concurrently changed to their new values. Thus, the problem is computing the order in which these variables should be changed so that a given invariant is never falsified during transition. Classes of invariants are that security properties are not falsified and mission critical services are not disrupted. For example, suppose we want to configure a static route and an IPSec tunnel at a router and that the invariant is that packets should not leave the router unencrypted. If the static route is configured before the tunnel, then the invariant will be violated. To maintain that invariant, the tunnel should be configured before the static route. In both orderings, the final configuration is identical but the first is unsafe whereas the second is safe.

A Reconfiguration Plan is now precisely defined:

Let $v1, \ldots, vk$ be the configuration variables in a system. Let init [v] and final [v] be the initial and final values, respectively, of the configuration variable v.

Let a reconfiguration sequence be a sequence of configuration variables representing the order in which these are set to their final value.

Where S is a reconfiguration sequence and v a variable in S, let val [v, S] be the value of v after S, i.e., if v is a member of S, then final [v] else init [v].

Let Invariant be a constraint on configuration variables, and S a reconfiguration sequence. Then, Invariant is said to hold after S provided when each configuration variable v in Invariant is replaced by val [v, S], the resulting constraint is true.

A reconfiguration plan is a reconfiguration sequence s containing all configuration variables such that Invariant holds for each non-empty subsequence of S.

Illustrative examples of reconfiguration plans for realistic cases will now be described.

Example: Configuring Security Before Routing.

Suppose on a router there are two variables route and tunnel such that init [route]=init [tunnel]=0 and final [route]= final [tunnel]=1. Here 0 represents a null address and 1 represents a real address. If route is set to a real address then packets are routed to that address. If tunnel is set to a real address then packets destined to that address are encrypted. However, tunnel should be set before route otherwise data may leak out of the router unencrypted. The definition of Invariant is as follows:

Invariant(route,tunnel)=(route=1=>tunnel=1)

This means that if there a route to 1 then the tunnel to 1 is already in place. A reconfiguration plan is the sequence tunnel, route but not the sequence route tunnel.

Example: Safely Decommissioning Router

Figure 1:
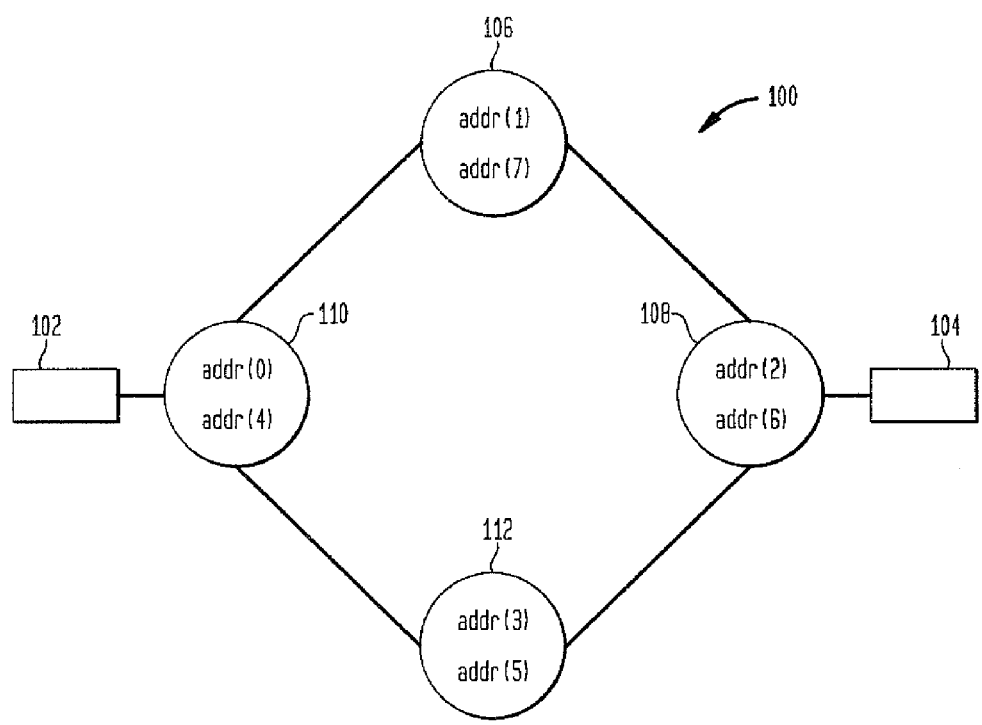
FIG. 1 shows an example where a router needs to be decommissioned without interrupting packet flow between two hosts.

Next is a larger example where a router needs to be decommissioned without interrupting packet flow between two hosts. FIG. 1 shows an IP network 100 in which hosts 102 and 104 are connected by a network of routers 106, 108, 110, and 112. Initially, packets between host 102 and host 104 are routed via router 106. Router 106 has to be decommissioned and packets routed via router 112.

Each router has static routes specifying the next hop router to which a packet to a given destination must be forwarded. At each router in FIG. 1, the configuration variable on top represents the next hop for destination host 104 and that at the bottom the next hop for destination host 102. The initial and final values of these variables are shown in Table 1. In the initial configuration, packets from host 104 to host 102 flow along the path router 108, router 106, and router 110, and packets from host 102 to host 104 flow along the path router 110, router 112, and router 108. In the final configuration, router 106 is decommissioned so packets from host 104 to host 102 flow along the path router 108, router 112, and router 110, and packets from host 102 to host 104, along the path router 110, router 112, and router 108. In intermediate configurations, packets can flow along either of the two paths.

TABLE 1

Initial and Final Values of Configuration Variables

| Variable | Initial value | Final value |
|---|---|---|
| addr(0) | 1 | 4 |
| addr(1) | 2 | 0 |
| addr(2) | 6 | 6 |
| addr(3) | 0 | 2 |
| addr(4) | 5 | 5 |
| addr(5) | 0 | 3 |
| addr(6) | 1 | 4 |
| addr(7) | 3 | 0 |

The invariant that must be preserved in the transition from initial to final configuration is that static routing between host 102 and host 104 is enabled in both directions, via router 106 or router 112. This invariant would be violated if the first reconfiguration action is setting addr(1) to 0. Then packets flowing from host 102 to host 104 will be lost because router 110 would continue to send packets to router 106 but router 106 would not have a route to host 104 so it would drop the packets. This invariant called router_migration_invariant is defined as follows:

```
router_migration_invariant =
and(or(routing_102_104_via_106, routing_102_108_via_112),
    or(routing_104_102_via_106, routing_104_102_via_112))
```

It states that routing between host 102 and host 104 in both directions is available either via router 106 or router 112. Subsidiary definitions are:

```
Routing_102_104_via_106 = and(addr(0)=1, addr(1)=2,
    addr(2)=6)
Routing_102_104_via_112 = and(addr(0)=4, addr(3)=2,
    addr(2)=6)
Routing_104_102_via_106 = and(addr(6)=1, addr(7)=3,
    addr(4)=5)
Routing_104_102_via_112 = and(addr(6)=4, addr(5)=3,
    addr(4)=5)
```

A reconfiguration plan for the above invariant is:

```
        addr(2),
        addr(5),
        addr(4),
        addr(3),
        addr(0),
        addr(1),
        addr(6),
        addr(7)
```

It can be verified that this order preserves the invariant for all subsequences. Only after addr (5) is reset is addr (4) reset so packets between host 104 and host 102 flow via router 112. Only after addr (3) is reset is addr (0) reset so packets between host 102 and host 104 also flow via router 112. addr (1) is reset only after addr (0). addr (7) is the last one to be reset.

Example: VPN Setup Planning.

Figure 2A:
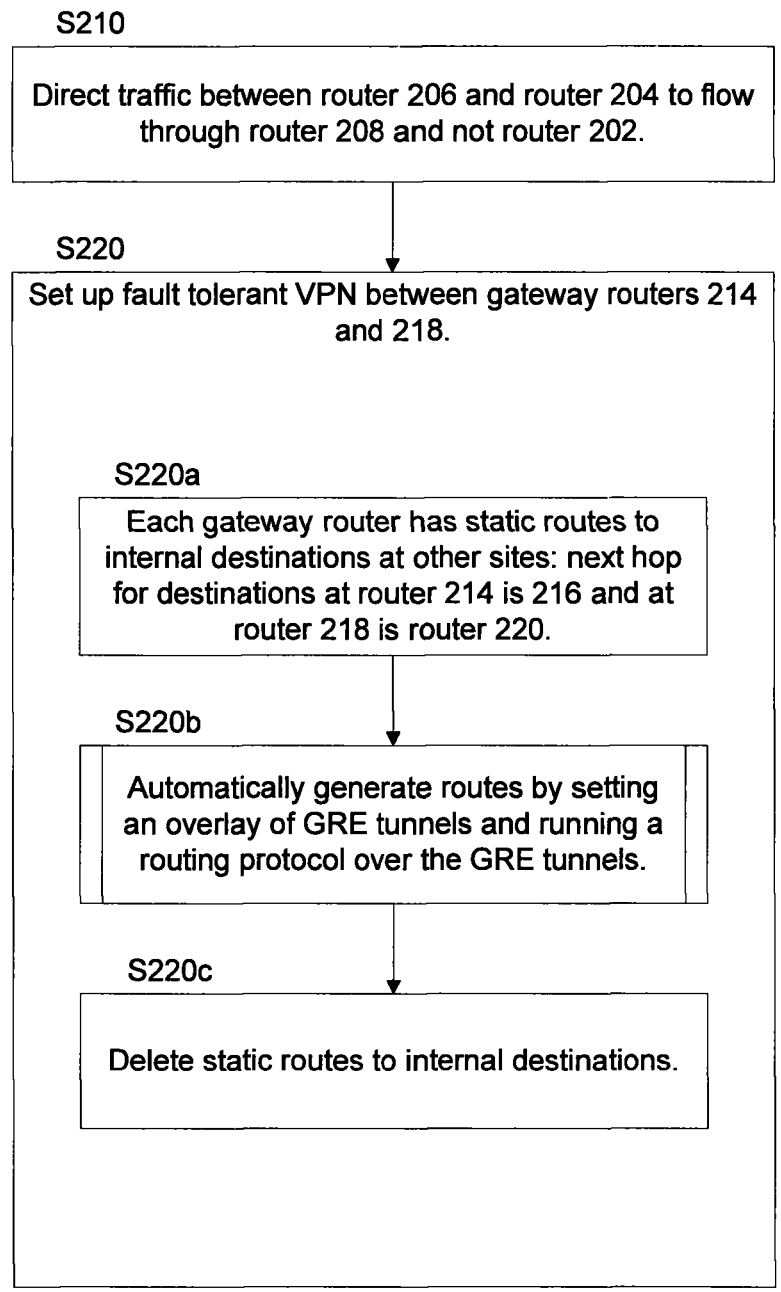
FIGS. 2A-2B show one or more aspects of VPN setup planning in accordance with an embodiment of the present invention.
Figure 2B:
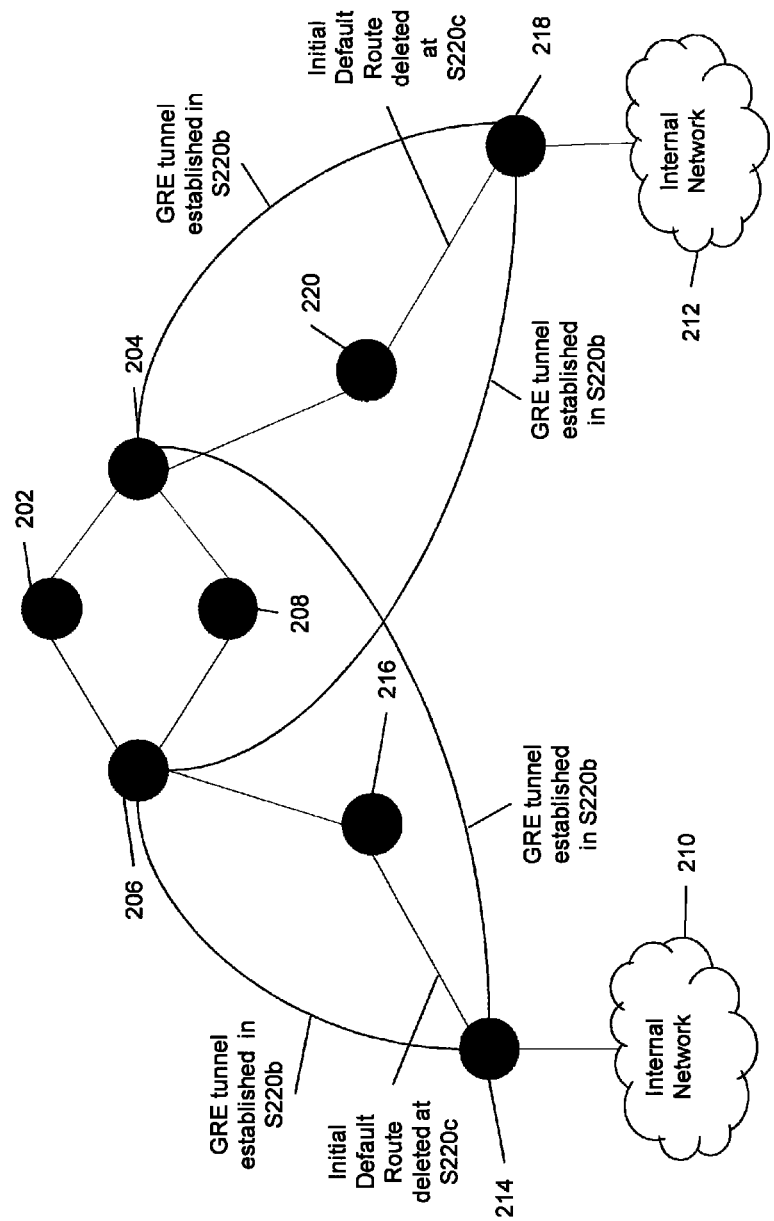

In FIGS. 2A-2B, having safely directed traffic between router 206 and router 204 to flow through router 208 instead of router 202 (S210), the goal is now to set up a fault-tolerant Virtual Private Network (VPN) between gateway routers 214 and 218 (S220). Initially, each gateway router has static routes to internal destinations at all other sites (S220a). The next hop for all destinations at router 214 is router 216 and that for all destinations at router 218 is router 220. Since such routes are hard to maintain, it is desirable to have these routes automatically generated. This is accomplished by setting up an overlay of GRE tunnels shown by the labeled lines in FIG. 2B and running a routing protocol over the GRE tunnels (S220b). Then, static routes to internal destinations can be deleted (S220c). A static route is deleted by setting its next hop to the null value 0. If routes are deleted before VPN setup, then connectivity between sites can be lost. The new configuration variables and their initial and final values are specified in Table 2:

TABLE 2

Initial and Final Values of Configuration Variables for Fault-TolerantVPN

| Variable | Initial value | Final value |
| --- | --- | --- |
| remote_gre_1(214)) | 0 | 206 |
| remote_gre_2(214) | 0 | 204 |
| remote_gre_1(218) | 0 | 206 |
| remote_gre_2(218) | 0 | 204 |
| nh(214) | 216 | 0 |
| nh(218) | 220 | 0 |

The first row states that on router 214 there is a configuration variable remote_gre_1 (214) representing the remote endpoint of a GRE tunnel originating at router 206. When variable is set to 206, a GRE tunnel is set up between router 214 and router 206. When it is set to 0, the GRE tunnel is disabled. Similarly, for the next three variables. The second last row states that on site 214 there is a configuration variable nh (214), representing a static route. When it is set to 216, site 214 forwards all packets to 216. When it is set to 0, the static route is disabled. Similarly, for the last row. The invariant that is maintained at all times is vpn defined by the following rules:

```
vpn = and(vpn_setup_invariant(214), vpn_setup_invariant(218))
vpn_setup_invariant(X) = or(gre_setup(X),static_routing(X)).
gre_setup(X) = and(remote_gre_202(X)=204,
    remote_gre_204(X)=206)
static_routing(X) = not(nh(X)=0)
```

The first rule states that vpn is a conjunction of vpn_setup_invariant for site 214 and site 218. The second rule states that vpn_setup_invariant holds for router X provided either the GRE tunnels are set up on x or static routing is enabled on X. The third rule states that GRE tunnels are set up on x if remote_gre_202 (X) and remote_gre_204 (X) are set to router 206 and router 204 respectively. The last rule states that static routing is enabled on X provided nh (X) is non-zero. A reconfiguration plan that preserves vpn is:

```
    remote_gre_202(214)
    remote_gre_202(218)
    remote_gre_204(214)
    remote_gre_204(218)
    nh(214)
    nh(218)
```

This first sets up the GRE network then removes the static routes.

Example: Combining Router Migration and VPN Setup.

Next, combine the planning problems for router migration and VPN setup. In addition to maintaining the previous two invariants, we also require that the packets be allowed to flow through GRE tunnels only after router decommissioning has been completed. The new invariant full vpn is defined as follows:

```
full_vpn = and(router_migration_invariant,
    vpn,
    implies(any_static_route_removed, path_lower))
any_static_route_removed = or(nh(214)=0, nh(218)=0)
path_lower = and(addr(4)=5,
    addr(2)=6,
    addr(6)=4,
    addr(5)=3,
    addr(0)=4,
    addr(3)=2)
```

The first rule states that full_vpn is a conjunction of three invariants. The first is for safe decommissioning of the router. The second is for safe setup of the VPN. The third is for ensuring that router decommissioning is completed before any static route is removed. In general, to specify that constraint A is satisfied before B one can use the implication implies (B, A). A reconfiguration plan is:

```
    addr(5)
    remote_gre_1(7)
    addr(4)
    addr(3)
    addr(6)
    addr(2)
    addr(7)
    remote_gre_1(8)
    remote_gre_2(8)
    addr(0)
    addr(1)
    remote_gre_2(7)
    nh(8)
    nh(7)
```

Reconfiguration Planning Method

The following is the method of the present invention to compute reconfiguration plans. The concept behind the algorithm is to transform the requirement that an invariant is always preserved into a constraint on the times at which the configuration variables change. This constraint is then solved by ConfigAssure. An invariant Inv is expressed as a QFF in the same way as any other requirement is, by defining the eval (Inv, QFF) predicate.

Let v1 . . . , vk be all the configuration variables in a system. Let time [v] be a positive, integer-valued time at which the value of configuration variable v is changed from init [v] to final [v]. The function time is a one-to-one mapping between the set of configuration variables and the integers in the interval [1, k]. The time function becomes an encoding of a reconfiguration sequence. The value of a configuration variable v immediately after time t is defined as follows: If time [v]=<t then init [v] else final [v].

A reconfiguration plan is found by finding values of the time variables time [v1], . . . time [vk] so that Invariant holds immediately after each time in [1, k]. This plan is computed by first deriving a constraint on the time variables for the Invariant to hold after a generic time t. For each t in [1, . . . , k], this constraint is instantiated. The conjunction of resulting instantiations is the constraint that Invariant holds immediately after each time in [1, ..., k]. This constraint, along with the one that all time variables are distinct, is then solved. More precisely:

For every configuration variable v in the definition of Invariant, replace it by the expression if time [v]=<t then init [v] else final [v]. Call the resulting constraint holds (Invariant, t).

Let all_times [Invariant] be the conjunction of holds (Invariant, 1), ..., holds (Invariant, k). Note that this conjunction only contains the variables time [v1], ..., time [vk].

Solve the conjunction of all_times (Invariant) and the constraint that for no two distinct variables x, y is it the case that time [x]=time [y].

We now illustrate this algorithm in the context of the routing/tunneling example. The invariant was defined as:

Invariant(tunnel,route)=(route=1=>tunnel=1)

Applying the above transformation, holds (Invariant, t) is the constraint:

(if time[route]=<t then 1 else 0)=1 =>
(if time[tunnel]=<t then 1 else 0)=1 if t1[v]<=t then init[v]
else if t2[v]<=t then mid[v]
else final[v]

all_times (Invariant) is then the conjunction of holds (Invariant, t) for each value of t in 1, ..., 2*k where k is the number of configuration variables.

Note that mid [v] need not be known in advance. It is treated as another configuration variable whose value, along with those of t1 [v] and t2 [v] will be computed when all_times (Invariant) is solved. This idea is generalized to the case where variables can take on more than one intermediate value.

The size of the constraint all_times (Invariant) is O (v*s) where it is the number of distinct variables in the invariant and s is the size of the invariant This is because holds (Invariant, t) is a constraint in which each variable is replaced by an expression of constant size. This constraint is instantiated as many times as there are distinct variables. Table 3 below shows the evaluation of performance of the reconfiguration algorithm for the full_vpn invariant above. For up to 146 configuration variables over 40 routers, the performance was acceptable at or below 107.59 seconds. However, when the number of variables was raised to 158, the system crashed.

TABLE 3

Performance Evaluation of Reconfiguration Planning Algorithm

| Routers | 14 | 24 | 34 | 40 | 44 |
|---|---|---|---|---|---|
| Configuration Variables | 68 | 98 | 128 | 146 | 158 |
| QFF Construction Time (s) | 1.47 | 2.28 | 5.23 | 7.64 | 9.89 |
| QFF To Kodkod Translation Time (s) | 0.28 | 0.91 | 1.74 | 2.69 | 3.25 |
| Kodkod To Boolean Translation Time (s) | 1.762 | 5.908 | 12.318 | 16.835 | Aborted |
| SAT Solving Time (s) | 0.451 | 16.794 | 44.234 | 80.425 | |
| Boolean Variables | 39464 | 122775 | 251174 | 350959 | |
| Primary Boolean Variables | 1216 | 2176 | 3136 | 3712 | |
| CNF Size | 92900 | 295720 | 612608 | 857536 | |
| Total Time | 3.963 | 25.892 | 63.522 | 107.59 | | all_times (Invariant) is the conjunction of holds (Invariant, 1) and holds (Invariant, 2). Solving it for the variables time [tunnel] and time [route] produces the solution:

time [tunnel]=1, time [route]=2

The reconfiguration plan is then the sequence tunnel, route.

In allowing the variables to take on intermediate values it was previously assumed that a configuration variable v only assumes two values init [v] and final [v]. Sometimes, the need arises for a variable to assume intermediate values, for example, where two interfaces need to have their addresses swapped without passing through a state where the two interfaces have identical addresses. It is impossible to safely accomplish this swap. Suppose the addresses are addr (0) and addr). Then only two orderings are addr (0), addr (1) and addr (1), addr (0). In each case, after the first variable change, the values of the two variables will be identical. If, however, addr (0) could take on an intermediate value then the swap can be safely accomplished.

Now the previous algorithm will be generalized to allow variables to assume intermediate values. In addition to taking on init [v] and final [v], let variable v also take on a single intermediate value mid [v]. Suppose it changes to mid [v] at time t1[v] and to final [v] at time t2 [v]. Then, to compute holds (Invariant, t), replace every occurrence of v in the definition of Invariant by the expression:

In the above description there was separation of the problem of finding a final configuration satisfying a correctness requirement R from that of computing a reconfiguration plan that maintains an invariant I. However, it is possible that a final configuration be given for which there is no reconfiguration plan. In general, one cannot separate the computation of a final state from that of a reconfiguration plan. One needs to combine these into a single computation. This combination is easily accomplished in ConfigAssure by letting final [v]=v for each configuration variable v and then solving the conjunction of R and all_times (I). The resulting solution, if any will compute both a final configuration and a plan for reaching it.

Figure 3A:
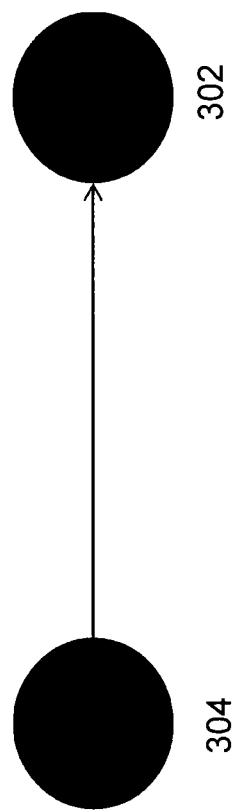
FIGS. 3A-3C illustrate an example of avoiding packet loss due to incorrect Maximum Transmission Unit (MTU) configuration.
Figure 3B:
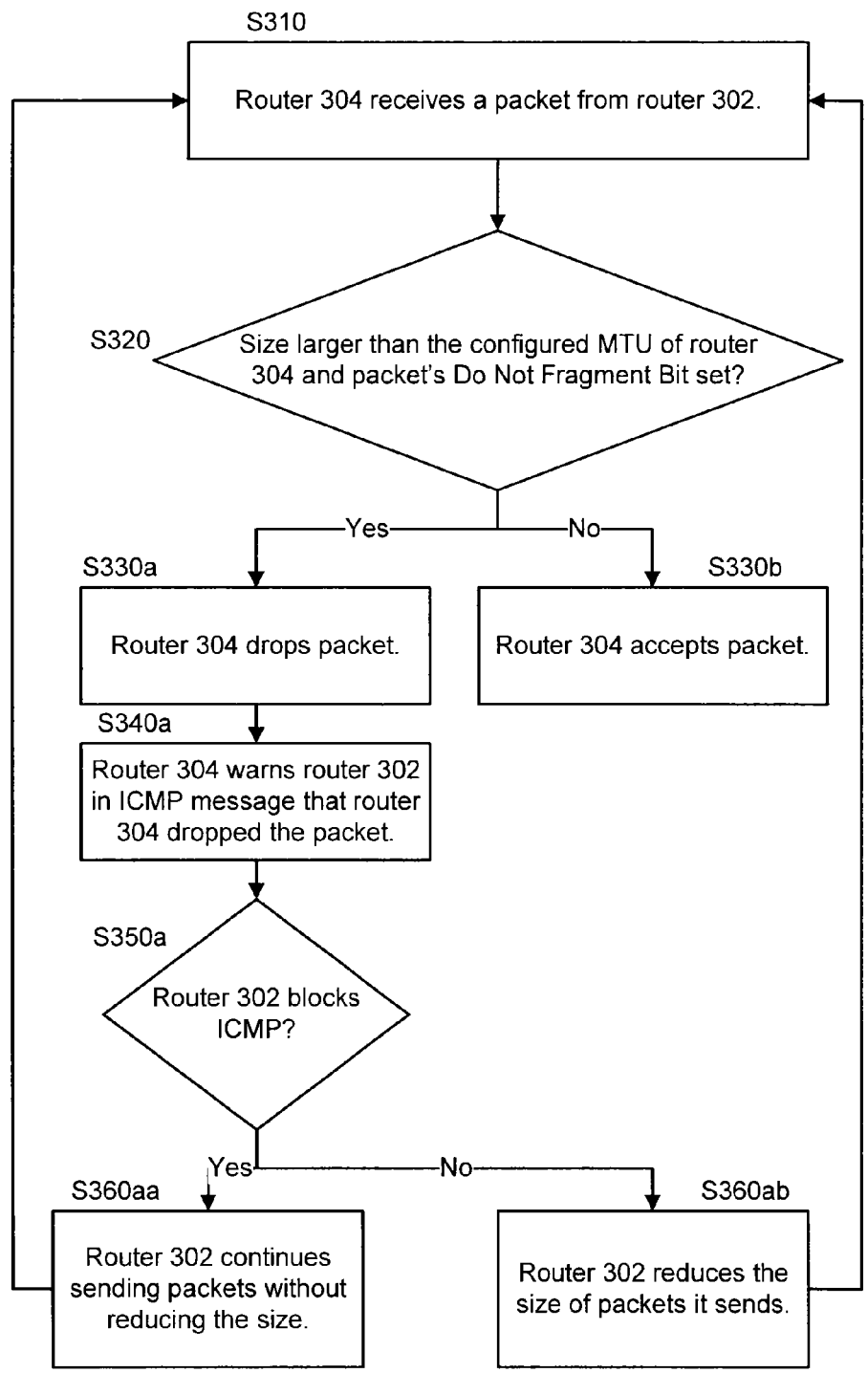
Figure 3C:
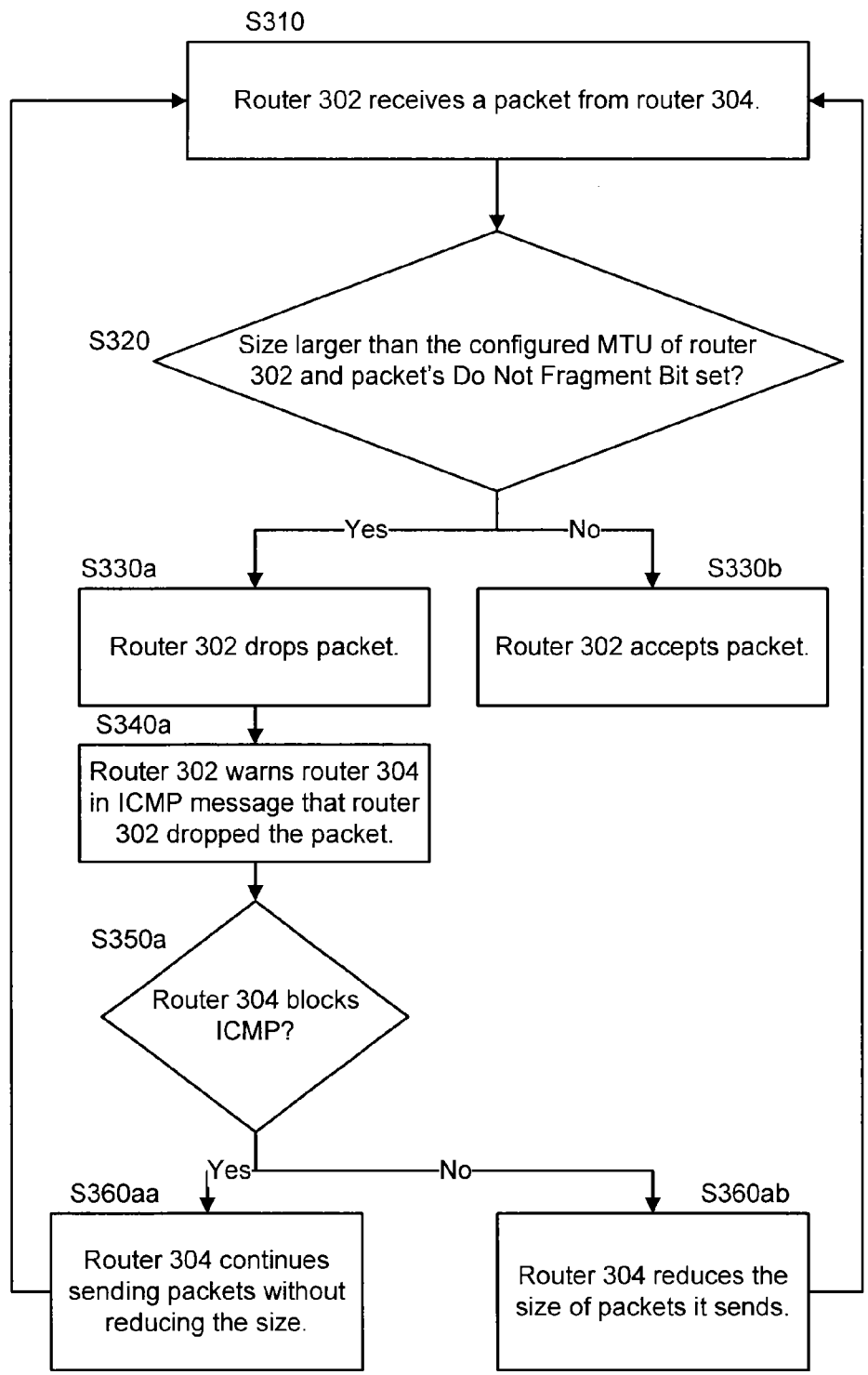

This is illustrated with an example of avoiding packet loss due to incorrect Maximum Transmission Unit (MTU) configuration. In FIGS. 3 and 3A, if a router 302 receives a packet from router 304 (S310) whose size is larger than router's 302 configured MTU, and the packet's Do Not Fragment bit is set (S320), router 302 will drop the packet (S330a). Router 302 will also warn router 304 in an internet control message protocol (ICMP) message that it has dropped the packet (S340a). Then router 304 can reduce the size of packets it sends (S350ab). However, since ICMP is the same protocol used to carry ping messages, router 304 may block ICMP (S350a). The result is that the router 304 will continue to send packets without reducing their size and they will all be dropped by router 302 (S360aa). This problem can also arise in the reverse direction per FIG. 3B.

Suppose that in the initial state, MTU at both routers is 1500 and ICMP is blocked. Suppose that the requirement on the final state is that MTUs of both routers be 1600. Suppose also that the invariant is that there is no packet loss due to MTU mismatch. Then, since there is no requirement on ICMP, a solution to the final state requirement is that MTUs are both 1600 and ICMP continues to be blocked. However, this final state is not reachable for any ordering of MTU variables. Both orderings will result in MTU mismatch that will not be mitigated because ICMP is blocked in both initial and final states.

A reachable final state is one where the MTU is 1600 and ICMP is enabled for both routers. We now show how to automatically discover this state.

Suppose there are four variables g_mtu, h_mtu, g_icmp, h_icmp whose initial values are, respectively, 1500, 1500, 0, 0. Let:

R = and(g_mtu = 1600, h_mtu = 1600)
I = or(g_mtu = h_mtu, g_icmp = h_icmp = 1)

The first rule defines the correctness requirement R. Not that the final value of g_icmp and h_icmp is unconstrained by R. The second rule defines the invariant condition I that the MTU values are equal or that the ICMP protocol is enabled at both routers.

Let the final value of each configuration variable be the variable itself and then solve the conjunction of R and all_times [I]. The final values of variables are:

g_icmp_0 = 1
h_icmp_0 = 1
g_mtu_0 = 1600
h_mtu_0 = 1600

Also computed is the reconfiguration plan for achieving it: g_icmp, h_icmp, g_mtu, h_mtu. In other words, first enable ICMP at both routers and then increase the MTU. The temporary MTU mismatch will be mitigated by ICMP's being enabled.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions stored in a computer or machine usable or readable storage medium or device, which causes the computer or machine to perform the steps of the method when executed on the computer, processor, and/or machine. A computer readable storage medium or device may include any tangible device that can store a computer code or instruction that can be read and executed by a computer or a machine. Examples of computer readable storage medium or device may include, but are not limited to, hard disk, diskette, memory devices such as random access memory (RAM), read-only memory (ROM), optical storage device, and other recording or storage media.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The Willis "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

While there has been described and illustrated a method for solving reconfiguration planning problems, it will be apparent to those skilled in the art that variations and modifications are possible without deviating from the broad principles and teachings of the present invention which shall be limited solely by the scope of the claims appended hereto.

What is claimed is:

1. A method of creating reconfiguration plans for changing variables from an initial value to a final value in a system while preserving constraints, comprising:
    a processor for performing computer instructions for:
        assigning configuration values v1, . . . , vk for each variable in a the system where k is a number of variables in the system;
        assigning time [v] to be a positive, integer-valued time at which the value of configuration variable v is changed from init [v] to final [v], where time [v] is a one-to-one mapping between the set of configuration variables and the integers in the interval [1, k];

encoding a reconfiguration sequence where the value of a configuration variable v immediately after time t is defined as follows: If time [v]=<t then init [v] else final [v];

forming a reconstruction plan by finding values of the time variables time [v1], ..., time [vk] so that Invariant holds immediately after each time in [1, k]; and computing by first deriving a constraint on the time variables for the Invariant to hold after a generic time t and for each t in [1, ..., k], the constraint is instantiated.

2. The method as set forth in claim 1, where for every configuration variable v in the definition of Invariant, replace v by the expression if time [v] =<t then init [v] else final [v] and the resulting constraint is holds (Invariant, t); Let all_times [Invariant] is the conjunction of holds (Invariant, 1), ..., holds (Invariant, k); and solve the conjunction of all_times (Invariant) and the constraint that for no two distinct variables x, y is it the case that time [x] time [y].

3. The method of claim 1, where variables assume intermediate values mid [v] and the variables change to mid [v] at time t1 [v] and to final [v] at time t2 [v]; and computing holds (Invariant, t), replace every occurrence of v in the definition of Invariant by the expression:

if t1[v]<=t then init [v]

else if t2 [v]<=t then mid [v]

else final [v]

all_times(Invariant) is then the conjunction of holds (Invariant, t) for each value of t in 1, ..., 2*k where k is the number of configuration variables.

\* \* \* \* \*